United States Patent [19]

Blenkush

[11] Patent Number: 5,033,777

[45] Date of Patent: Jul. 23, 1991

[54] MALE INSERT MEMBER HAVING INTEGRALLY MOLDED PART LINE FREE SEAL

[75] Inventor: Brian J. Blenkush, Maple Grove, Minn.

[73] Assignee: Colder Products Company, St. Paul, Minn.

[21] Appl. No.: 559,400

[22] Filed: Jul. 26, 1990

Related U.S. Application Data

[63] Continuation of Ser. No. 096,952, Sep. 15, 1987, abandoned.

[51] Int. Cl.⁵ .............................................. F16L 37/08
[52] U.S. Cl. .................................... 285/317; 285/423; 285/351
[58] Field of Search ............... 285/319, 320, 921, 331, 285/317, 423, 351; 249/184, 145, 144, 59, 151; 264/328.9

[56] References Cited

U.S. PATENT DOCUMENTS

| | | | |
|---|---|---|---|
| 3,314,696 | 4/1967 | Ferguson et al. | 285/921 X |
| 3,333,300 | 8/1967 | Cohan | 264/328.9 X |
| 3,481,000 | 12/1969 | Barfuss | 249/59 |
| 3,602,009 | 8/1971 | Powell | 285/320 X |
| 3,686,896 | 8/1972 | Rutter | 285/320 X |
| 3,997,195 | 12/1976 | Bartholomew | 285/331 X |
| 4,155,698 | 5/1979 | Aichinger | 249/59 X |
| 4,500,118 | 2/1985 | Blenkush . | |
| 4,541,457 | 9/1985 | Blenkush . | |
| 4,541,605 | 9/1985 | Kubota et al. | 249/184 X |
| 4,664,421 | 5/1987 | Jones | 285/110 |
| 4,679,827 | 7/1987 | Law | 285/331 X |
| 4,709,757 | 12/1987 | Bly | 264/328.9 X |
| 4,731,014 | 3/1988 | Holdt | 249/184 X |

FOREIGN PATENT DOCUMENTS 2077377 12/1981 United Kingdom ............... 285/921

OTHER PUBLICATIONS

Colder Products Company, "CPC Quick Coupling For Plastic Tubling", Form 589, Exhibit A.

Colder Products Company, "Thermoplastic and Chrome-Plated Quick Couplings and Components for Flexible Tubing", Form 884A, Exhibit B.

*Primary Examiner*—Dave W. Arola
*Attorney, Agent, or Firm*—Merchant, Gould, Smith, Edell, Welter & Schmidt

[57] ABSTRACT

A male insert member (12) having a part line free seal member (20) of one piece with the male insert member (12) and method for making the male insert (12) is disclosed. The male insert member (12) is configured for insertion into a female receptacle assembly (14) of a coupling assembly (10). The seal member (20) cooperates with an inner surface of a bore (30) to create a fluid tight seal therewith upon insertion into the bore (30).

13 Claims, 3 Drawing Sheets

MALE INSERT MEMBER HAVING INTEGRALLY MOLDED PART LINE FREE SEAL

This is a continuation of application Ser. No. 096,952, filed Sept. 15, 1987, and now abandoned.

BACKGROUND OF THE INVENTION

The present invention relates to a male insert member having a part line free circumferential seal integrally molded therewith and a method for making same.

There is an increasing demand for mass produced, inexpensive, coupling assemblies which can be readily coupled and uncoupled and wherein at least a part of the coupling assembly such as a male insert member is attached to a disposable container or other disposable item so as to be disposed of along with the disposable container or other item after the item has been used. Such disposable coupling assemblies enable the disposable items to have a portion of the coupling assembly, such as the male insert member, included as a part of its structure or readily interconnected thereto at the time of installation of the disposable items in a fluid handling system. When it comes time to dispose of the disposable items their associated coupling portions are disposed of along with the disposable item. This allows the disposable item to be quickly connected to a system and replaced as required without necessitating that the item and/or its associated coupling portion be cleaned and sanitized as would be required in many systems if the item and/or its associated coupling portion were reused. If a reusable coupling fitting is used with a disposable item, the reuseable coupling fitting must typically be separated from the disposable item and cleaned before it is reused with another disposable item.

The liquid packaging industry is using disposable containers incorporating disposable coupling portions for handling and dispensing of beverages, inks, industrial cleaners, and detergents as well as many other types of liquids. This eliminates much of the mess often associated with the packaging and handling of fluids since fluid containers can be quickly connected to and disconnected from a fluid handling system with less spillage. Moreover, for sanitary reasons, it is very desirable to have disposable liquid containers which include a throw-away coupling portion, so as to eliminate the need to clean the container and/or coupling portion. Also, contamination of fluids can be more readily prevented and switching from one type of fluid to another. The medical market is another area where a coupling system is required which can utilize a disposable coupling fitting. A throw-away or disposable coupling fitting which can be disposed of along with the disposable item is particularly helpful in maintaining sanitary conditions which are of the utmost importance in the medical environment. With diseases, such as AIDS, this takes on even increased importance. As discussed above, disposable coupling fittings do away with the need to clean and sterilize the used item and its associated coupling portion, which is both time consuming and expensive, thereby also facilitating the reduction of medical costs.

One example of a disposable item, is the use of disposable hypothermia blankets or pads. A coupling, preferably disposable, is required to typically connect the blanket or pad to a small pump which heats and circulates water through the blanket or pad. Disposing of the heating pad does away with the need to sanitize the heating pad before being used by the next user. Ideally, when the heating pad is disposed of, the coupling portion interconnected thereto is also disposed of. There are of course endless other applications for disposable coupling fittings.

It is important that the cost of disposable coupling fittings be kept to a minimum in order to reduce the cost of the overall product. Cost can typically be reduced if the coupling is mass producible and if its structure is relatively non-complex. However, despite the need for a low cost coupling fitting, it is very important that the coupling assembly be highly reliable and not leak. Therefore disposable coupling fittings must be manufactured to relatively tight tolerances. This in turn, typically necessitates stringent quality control which can be very expensive and time consuming. Additionally, the coupling fitting must be made of a material which is compatible with the liquid environment in which it is used.

Examples of various coupling assemblies are illustrated in applicant's U.S. Pat. Nos. 4,436,125('125) and 4,630,847('847).

Typically, coupling assemblies designed for use with disposable items will include a disposable male insert member attached to the disposable item and a cooperating non-disposable female receptacle member adapted for receipt of the male insert member. A mechanical latch/lock mechanism is used to retain the two coupling members in a coupled state. The coupling male insert members typically form a fluid tight seal with the cooperating coupling female receptacle members by the use of the cylindrical seal which circumferentially surrounds the male inserts. The exterior surface of the seal cooperates with the interior surface of the female receptacle upon insertion of the male insert into the female receptacle to form a fluid tight seal. The cylindrical seal is made of elastic material which is softer than the female receptacle such that the exterior surface of the seal will be deformed by the interior walls of the female receptacle upon insertion of the male insert into the female receptacle. Accordingly a fluid tight seal is formed between the two coupling members. A separate mechanical latch mechanism is used to positively latch the male insert and the female receptacle in a coupled state since the cylindrical seal has no appreciable retention affect due to its relative elasticity and its relatively small surface area which abuts the interior surface area of the female receptacle, the male insert and the female receptacle being configured for ease of insertion (connection) and removal (disconnection). The mechanical latch mechanism will often be associated with the female receptacle, the male insert including a groove or other cavity for receipt of a latch plate or the like mounted on the female receptacle.

While the male insert is often made from molded plastic or other materials, the seal typically might be a separate and distinct cylindrical o-ring made from a rubber-like material, the o-ring being typically seated in a groove of the male insert. The seal might also be a cylindrical ring-like structure integrally molded with the male insert. Both types of seals are in use in the industry, and both types of seals are shown in applicant's prior patents. However, both types of seals have definite disadvantages as currently made.

O-ring seals are relatively expensive and can add greatly to the cost of the coupling. Moreover, o-rings generally have part lines on their inner and outer rims which can interfere with their sealing function and cause quality control problems. With respect to integrally molded seals, in normal molding practices, when molding a coupling male insert member, a part line is produced that extends longitudinally of the male insert. The part line is formed at the location where the mold elements come together to form the male insert. If the seal is of the type which is formed integral with the male insert, the seal will similarly have the part line extending there across at a right angle to the seal. During the manufacturing process, the part line of the couplings must be monitored for flash and mold mismatch in order to assure the quality of the molded coupling fittings. Also the process must be closely monitored since there can be variations in the materials used; e.g., flow characteristics, etc., which will have a substantial affect on the part line. This is particularly important the integral seal since the part line can cause a fluid leak and/or over time cause wear which will result in a fluid leak. The quality control required to monitor the coupling manufacturing process is a very expensive and time consuming one. While this might be acceptable in most coupling markets where the couplings are produced in limited numbers and are more expensive, the quality control becomes a real problem when mass producing, inexpensive, disposable coupling fittings which must meet the requirements of such industries as the liquid packaging/handling industry and the medical industry.

The applicant has discovered that by use of a molding process which creates a part line free integral seal, disposable couplings fittings can be mass produced in an inexpensive fashion and yet meet the rather rigid quality requirements of the liquid packaging/handling industry and the medical industry. Use of a part line free seal substantially eliminates the flash and mold mismatch problems present with a part line.

There are interference fittings currently in use which are molded with a part line free tapered end. The tapered end of fitting is forced into a tubing or the like made of softer material than the tapered end of the fitting so as to deform and stretch the tubing, thereby providing an interference fit between the fitting and the tubing. The tapered end with its associated undercut shoulder portion serves to both form a fluid tight seal between the fitting and the tubing and also grip the interior surface of the tubing to retain the fitting and tubing in a coupled state so as to not require the use of a mechanical latch/lock mechanism. An example of this is shown in applicant's Ser. No. 818,245, filed Jan. 13, 1986 now U.S. Pat. No. 4,703,957 issued Nov. 3, 1987. Such fittings are not practical in those applications where a two part coupling assembly is used or where the fluid flow is large, since the tensile force required to separate a coupling from its receptacle is substantial. This is undesirable for several reasons. Moreover, they do not provide for a positive latching of the fittings in a coupled state. Accordingly, it is difficult to tell when the tapered fittings and their associated tubing are securely connected in a fluid tight state. Additionally, they present a leakage problem when connecting or disconnecting from the tubing.

The present invention solves these and other problems associated with existing disposable coupling fittings.

SUMMARY OF THE INVENTION

The present invention relates to a coupling assembly comprising a one piece molded male insert member and a cooperating female receptacle means for receiving the male insert so as to form a coupled state. The female receptacle including mechanical latch means cooperating with a cavity on an exterior surface of the male insert member for mechanically latching the male insert member and the female receptacle means in the coupled state and mechanically unlatching the male insert member and the female receptacle means thereby enabling removal of the male insert member from the female receptacle means so as to provide an uncoupled state, the male insert member and the female receptacle means both defining a pathway for the flow of fluid therethrough when in the coupled state. A seal member extends about an outer circumference of the male insert member, the seal cooperating with an interior surface of the female receptacle means to provide a fluid tight seal when in the coupled state. The seal member is integrally molded with the male insert so as to be of one piece with the male insert member and is part line free.

The present invention also relates to a male insert member having an integral, part line free seal of one piece with the male insert.

The present invention further relates to a method for making a male insert member of a coupling assembly with an integrally molded seal which is part line free. An outer surface of the seal is formed by a longitudinally retractable core pin. The remaining exterior surface of the male insert is formed by transversely retractable mold elements. The fluid pathway is formed by a second longitudinally retractable core pin insertable between the transversely retractable mold elements.

The present invention allows for a mass produced male insert member having an integral, part line free seal which is inexpensive, and yet will provide a reliable fluid tight seal.

In the preferred embodiment, the seal is dynamic in that it can be reused numerous times.

In a preferred embodiment, the male insert member includes a groove about its circumferential extent, the latch means including a latch plate member receivable in the groove so as to enable mechanical latching of the male insert to its cooperating female receptacle means.

In yet another embodiment the male insert member includes integrally molded latching means for engaging a shoulder portion of the female receptacle means.

In still other embodiments, the female receptacle means include latching means integrally molded therewith.

These and various other advantages and features of novelty which characterize the present invention are pointed out with particularity in the claims annexed hereto and forming a part hereof. However, for a better understanding of the invention, its advantages and objects obtained by its use, reference should be made to the drawings which form a further part hereof, and to the accompanying descriptive matter in which there is illustrated and described a preferred embodiment of the invention.

BRIEF DESCRIPTION OF THE DRAWINGS

In the drawings in which corresponding numerals and letters indicate corresponding parts throughout the several views.

DETAILED DESCRIPTION OF PREFERRED EMBODIMENT IN ACCORDANCE WITH THE PRINCIPLES OF THE INVENTION

Figures 1, 2, 3, 4, 6:
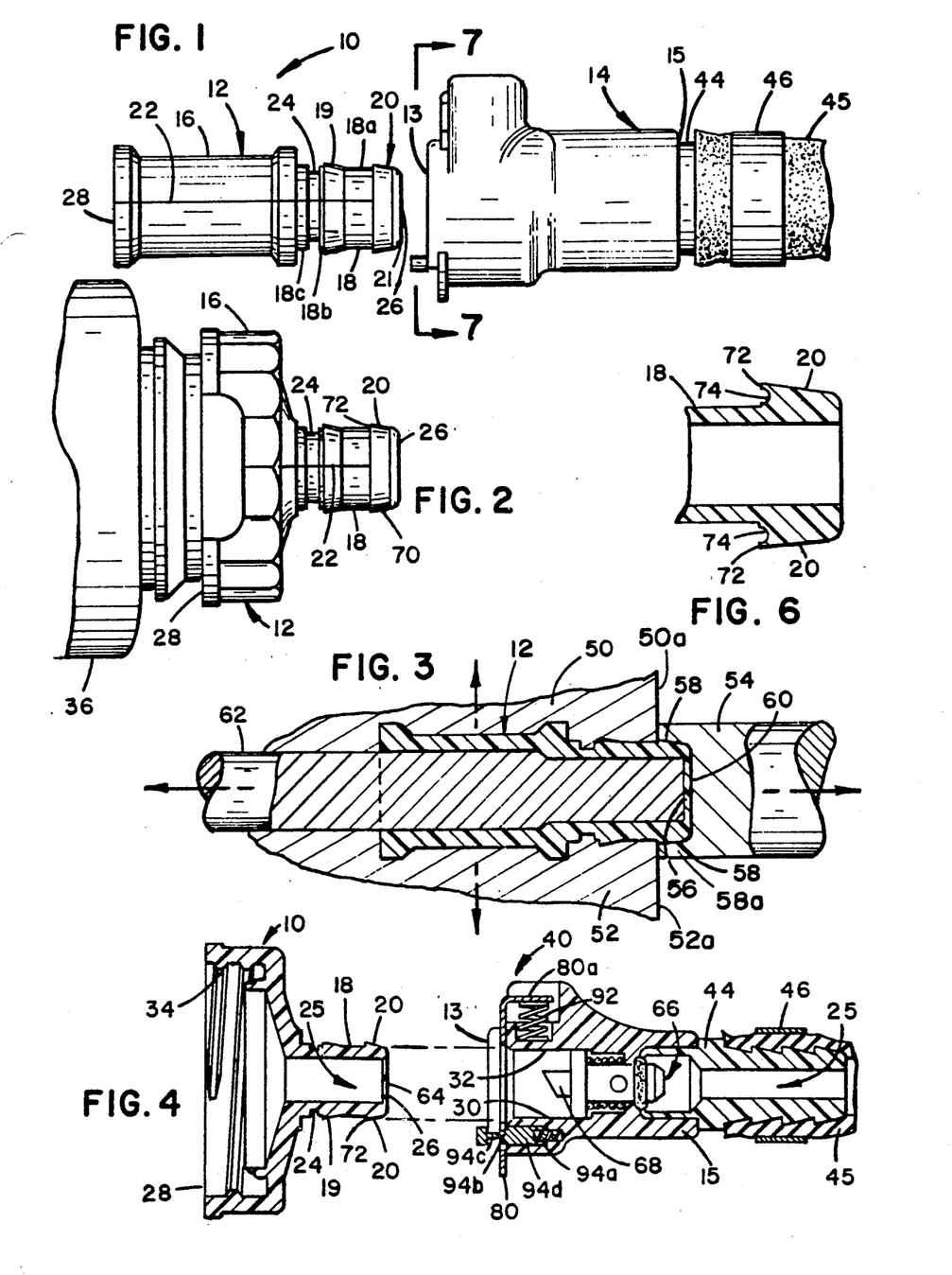
FIG. 1 is a view in perspective of an embodiment of a coupling assembly in accordance with the principles of the present invention.
FIG. 2 is a view in perspective of an alternative embodiment of a male insert member interconnected to a container in accordance with principles of the present invention.
FIG. 3 is an enlarged longitudinal, sectional view of the male insert embodiment of FIG. 1 being formed by a mold in accordance with the principles of the present invention, fragmentary portions of the mold elements being illustrated.
FIG. 4 is a partial sectional view illustrating the embodiment of the male insert shown in FIG. 2 and an embodiment of a female receptacle assembly in an uncoupled state, the male insert and the female receptacle assembly being in relative alignment with each other.
FIG. 6 is a partial enlarged sectional view of an alternate embodiment of a seal member in accordance with the principles of the present invention.

Referring now to the drawings, there is illustrated in FIG. 1 a preferred embodiment of a coupling assembly having a male insert member in accordance with the principles of the present invention, the coupling assembly being generally referred to by the reference numeral 10. The coupling assembly 10 shown includes the male insert member 12 and a female receptacle assembly 14. The male insert member 12 is shown including a body 16 having a tubular portion 18 proximate one end. The tubular portion 18 includes an integrally molded, cylindrical seal 20 which is part line free as opposed to the body 16 and the tubular portion 18 which have a part line 22. The part line 22 is formed at the interface of multiple mold elements during the molding process. The tubular portion 18 further includes a groove 24 extending about the circumferences of the tubular portion 18. The coupling assembly 10 defines a fluid pathway 25 therethrough so as to allow the flow of fluid through the coupling assembly 10 when the male insert 12 and the female receptacle assembly 14 are in a coupled state. The male insert 12 includes first and second ends 26,28 (also referred to as front and back ends) and the female receptacle assembly includes first and second ends 13,15 (also referred to as front and back ends). The first and second ends 26,28 of the male insert 12 are suitably interconnectable to cooperating items in a variety of arrangements. In the embodiments shown in FIGS. 1 and 4, the first end 26 of the male insert 12 is receivable in a bore 30 of the female receptacle assembly 14. The cylindrical seal 20 is made of resilient material which is softer than the female receptacle assembly 14 and is of a slightly larger outside diameter than the inside diameter of the bore 30 such that upon insertion into the bore 30, the cylindrical seal 20 is deformed so as to form a fluid tight seal with a wall 32 of the bore 30.

In one embodiment, the male insert 12 might be made from a low density polyethylene material which is chemically resistive such as polypropylene having a density of 0.917 g/cm$^3$ and a melt-flow value of eight cm/min. One example of a commercially available polyethylene material is sold under the name GULF 1007. In the embodiment shown, the cylindrical seal 20 has an inclined surface, diverging in a direction toward the back end 28 of the male insert 12 so as to have a generally frustroconical outer shape. In one embodiment, the male insert 12 might have an outside diameter of 1.10 cm proximate its front end, which is roughly the outside diameter of the tubular portion 18, and an outside diameter of 1.16 cm proximate its back end. The bore 30 might have an inside diameter of 1.12 cm. The front end 26 of the male insert 12 includes a radiussed front end portion 21 immediately adjacent and in front of the seal 20 thereby eliminating any sharp edges at the front end of the male insert 12. The radiussed front end portion 21 and the inclined, substantially flat surface of the seal 20 facilitate insertion of the male insert 12 into the female receptacle assembly 14. In the embodiment shown, the seal 20 has a longitudinal length of 0.25 cm. A tubular portion 18a having a length of 0.76 cm and an outside diameter of 1.10 cm separates the seal 20 from a second seal 19 similar to the seal 20. The two seals 19,20 cooperate to provide increased support so as to resist bending of the male insert 12 relative to the female receptacle assembly 14 so as to further reduce the likelihood of fluid leakage due to any bending forces or stresses placed on the coupling assembly 10. The groove 24 in embodiment shown, is disposed between tubular portions 18b which have an outside diameter of substantially 1.10 cm.

The embodiment of the female receptacle assembly 14 shown includes a mechanical latch assembly 40 engaging the groove 245 and mechanically latching the coupling assembly 10 in a coupled state once the male insert 12 is fully inserted into the female receptacle assembly 14. An example of a female receptacle assembly 14 and latch assembly 40 which might be used in keeping with the principles of the present invention is fully described in applicant's U.S. Pat. No. 4,436,125 which is hereby incorporated by reference.

It will be appreciated that numerous embodiments of the male insert 12, the female receptacle assembly 14, and the latch mechanism 40 might be used in accordance with the principles of the present invention.

Figure 5:
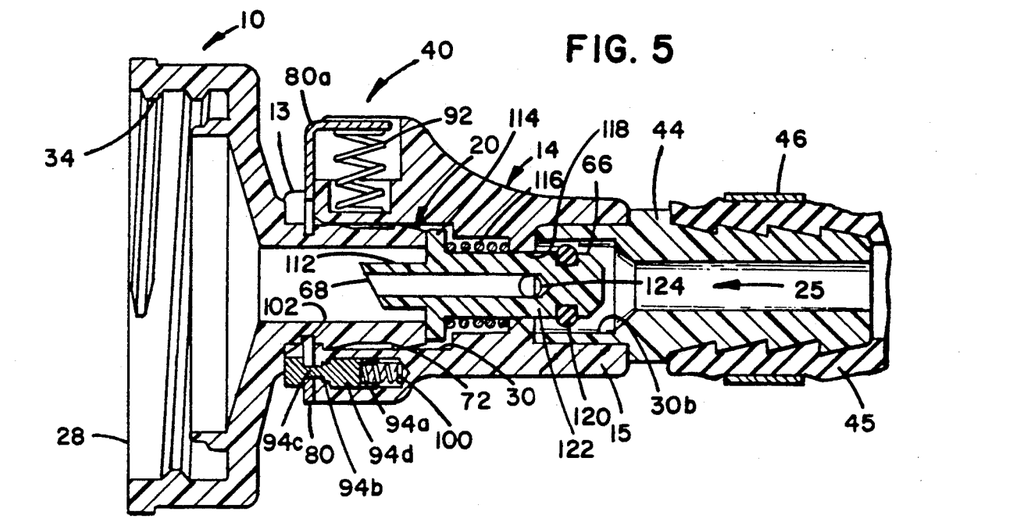
FIG. 5 is a view similar to that of FIG. 4 illustrating the male insert and the female receptacle assembly in a coupled state.

The second end 28 of the male insert 12 might be interconnected to any number of cooperating containers and/or items of varying configurations. For example, illustrated in FIGS. 2 and 4, is an alternative embodiment of the male insert 12. In this embodiment, the second end 28 includes internal threads 34 for threaded attachment to a disposable container 36 or the like. This embodiment of the male insert 12 might be used for attachment to disposable liquid containing containers such as commonly used in the beverage and medical industries. As illustrated in FIGS. 4 and 5, the second or back end 15 of the female receptacle 14 might be interconnected to a conduit 44 by suitable methods such as fusing of plastics. The conduit 44, in turn, might be interconnected to a flexible hose 45 by a suitable clamp 46. It will be appreciated that although only a few embodiments are shown in this disclosure, the applications and uses for the present invention are numerous and diverse.

As illustrated in FIG. 3, the male insert 12 is made by using a mold apparatus including two oppositely retractable, identical mold elements 50 and 52 having ends 50a and 52a respectively which form the body 16 of the male insert 12 with the exception of the cylindrical seal 20 proximate the first end 26. The first end 26 with the cylindrical seal 20 extends beyond the ends of the mold elements 50 and 52 when the mold elements are brought together into a mold forming position. The mold elements 50 and 52 are manipulated by a suitable support structure (not shown) for transverse movement away and toward the male insert 12 in a direction generally at right angles to the longitudinal axis of the male insert 12. In FIG. 3, this movement would generally be toward the top and bottom of the drawing. Each of the mold elements 50 and 52 will form roughly one-half of the body 16 of the male insert 12. A longitudinally retractable mold element member 54, suitably supported by a support structure (not shown) for longitudinal movement away and toward the male insert 12, cooperates with the mold elements 50 and 52 to form the part line free, cylindrical seal 20 proximate the first and 26. Movement of the mold element 54 as shown in FIG. 3, will generally be toward the right of the drawing when being retracted and toward the left of the drawing when being positioned for molding. The mold element 54 shown in a solid core pin member including an end cavity 56 being formed by inclined side walls 58 forming shoulder portions 58a and a substantially flat end or bottom wall 60 for forming the integrally molded, part line free cylindrical seal 20 having inclined walls diverging in direction away from the first end 26 of the male insert 12. A second longitudinally retractable mold element member 62, suitably supported by a support structure (not shown) for longitudinal movement away and toward the coupling insert 10, cooperates with the mold elements 50,52 and 54 to form the male insert 12 and the fluid pathway 25 through the male insert 12. The mold element 62 will move toward the left of the drawing when being retracted and toward the right of the drawing when being positioned for molding. The mold element 62 will be solid core pin member whose outer diameter will cooperate with an inner diameter of the mold elements 50,52 and 54 to form a space 55 which will be filled with liquid plastic during the molding process so as to form the male insert 12.

The embodiment of the male insert 12 shown, includes a puncturable membrane member 64 extending across the first end 26 enclosing and sealing the first end 26. This membrane 64 is formed by leaving a gap between the mold element 54 and the mold element 62. In use, the membrane member 64 is punctured upon insertion of the male insert 12 into the female receptacle assembly 14. The embodiment of the female receptacle assembly 14 shown includes a slidable valve assembly 66 including a needlelike end 68 for puncturing the membrane 64 upon insertion of the male insert 12, the valve assembly 66 preventing fluid flow from the back end 15 to the front end 13 of the female receptacle assembly 14 when in an uncoupled. An embodiment of such a valve assembly 66 is disclosed in applicant's U.S. Pat. No. 4,436,125 which as indicated above is hereby incorporated by reference. It will be appreciated that other embodiments of the male insert 12 need not have such a membrane member present and that various embodiments of the valve assembly 66 might be used. For example, although not shown, the male insert 12 might also include a valve assembly for resealing the fluid pathway through the male insert 12 when in an uncoupled state.

In the embodiments of the male insert shown in FIGS. 1-4, the cylindrical seal 20 is shown having an inclined, also referred to as tapered or slanted, substantially flat outer surface 70, the cylindrical seal 20 having an ever increasing outer diameter with increasing distance from the first end 26. The mold elements 50 and 52 undercut the cylindrical seal 20 to form a relatively sharp shoulder portion 72. The shoulder portion 72 extends transversely of the male insert 12.

Illustrated in FIG. 5 is an alternate embodiment of the cylindrical seal 20 wherein the shoulder portion 72 of the cylindrical seal 20 includes a cavity 74 therein. The cavity 74 causes the cylindrical seal 20 to be more flexible and resilient than if it were solid. Accordingly, the cylindrical seal 20 will be more readily deformed when inserted into the female receptacle assembly 14. Thus the cylindrical seal 20 of this embodiment need not be made from as soft a material as required if it were solid.

Figure 7:
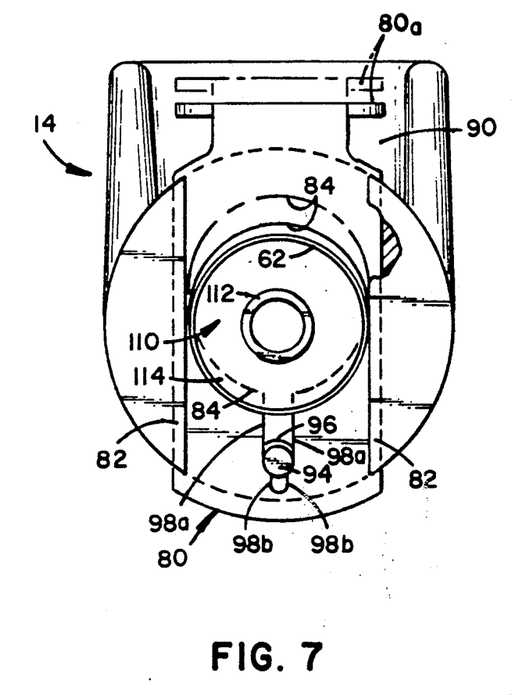
FIG. 7 is an enlarged elevational view generally along line 7—7 of FIG. 1 with portions being broken away for purposes of illustrations.
Figure 8:
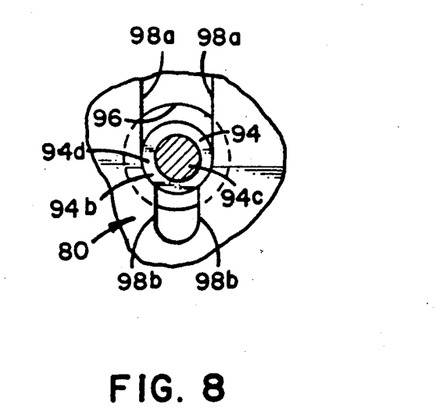
FIG. 8 is a partial view of FIG. 7 with portions shown in section.

Referring now to FIGS. 4,5,7 and 8, the embodiment of the latch mechanism 40 shown will now be described in more detail; however, as discussed above any number of differing positive latch arrangements might be used in keeping with the principles of the invention. The latch mechanism 40 includes a latch plate 80 which is slideably mounted in grooves formed by two projections 82 extending from the front of the female receptacle assembly 14. The latch plate 82 is slideably mounted for transverse movement of the bore 30 between a first released position as illustrated in FIG. 4 and a second latched position as illustrated in FIG. 5. The latch plate 80 defines an annular aperture 84 therein such that in the released position the tubular portion 18 can be inserted therethrough into the bore 30. In the latched position, an inner edge 86 of the latch plate 80 projects into groove 24 of male insert 12, thereby positively latching the male insert 12 with the female coupling assembly 14 in a coupled state as generally illustrated in FIG. 5. A housing of the female receptacle assembly 14 defines a recess of indentation 90 proximate its top portion as shown in FIGS. 4 and 5 between the projections 82. The latch plate 80 includes a portion 80a which is folded over so as to provide a relatively flat lever which fits in the space provided by the indentation 90. A coiled spring 92 positioned between lever portion 80sa and a bottom surface of the indentation 90 as so to bias the latch plate 80 transversely of the bore 30 and toward the latched position. A locking pin 94 of varying diameter, positioned in an axially extending bore 96 serves to retain the latch plate 80 in its released position when the male insert 12 and the female receptacle assembly 14 are in an uncoupled state. The bore 96 is positioned radially outward from the bore 30 and on an opposite side of the bore 30 from the lever 80a as to be diametrically opposed to the lever 80a. The pin 94 extends through a slot of variable width defined by edges 98a and 99b in the latch plate 80 which extends radially outward from the inner edge 86. The pin 94 is longitudinally moveable between a first position wherein the pin 74 retains the plate 80 in its released position and a second position wherein the pin 94 allows the spring 92 to move the latch plate 80 into its latched position. The lock pin 94 in its second position also serves to limit the distance which the latch plate 80 moves from its released position to its latched position. A coiled spring 100 is positioned between a collar position 94a of the pin 94 and end of the bore 76 so as to longitudinally bias the pin 94 toward the first position. The male insert 12 has a collar 102 about the circumference thereof which is spaced a predetermined axial distance from the groove 24 toward the second end 28 of the male insert 12. The collar 102 is constructed and arranged to engage the pin 94 as the tubular portion 18 is inserted into the bore 30 of the female receptacle assembly 14 a predetermined distance such that the pin 94 is pushed back from its first position into its second position. As illustrated in FIGS. 7 and 8, radially extending edges 98a are spaced farther apart than edges 98b such that the slot in the latch plate 80 has a portion near the inner edge 86 of the patch plate 80 with a greater width than the portion near the end of the slot farthest removed from the inner edge 86. When the pin 94 is in the first position, the released position, a portion 94b of the pin 94 having a greater diameter than the width of the slot defined by the edges 98b, extends through the slot so as to make contact with edges 98b and prevent the latch plate 80 from being moved into the latched position by the coil spring 92. As the male insert 12 is inserted into the female receptacle assembly 14, the collar 102 engages the end of the lock pin 94 and moves it longitudinally relative to the female receptacle assembly 14 until a portion 94c of the lock pin 94 having a diameter less than the width of the slot defined by the edges 98b is aligned therewith such that the lock pin 94 no longer engages the edges 98b. The latch plate 80 is then moved into the latched position the coil spring 92 and engages the grooves 24. By pressing radially inward on the lever 80a, the latch plate 80 is caused to move radially such that the pin 94 extends through the enlarged slot portion near the inner edge 86. In addition, the latch plate 80 is disengaged from the groove 24, whereby the male insert 12 can be removed from the female receptacle assembly 14. When the male insert 12 is removed, the collar 12 and the pin 94 are disengaged whereby the spring 100 biases the pin 94 toward its first position, so that the pin portion 94b engages the edges 98b of the slot and retains the latch plate 80 in its released position. The pin 94 includes a portion 94d between the portions 94a and 94b which is of greater diameter than 94b so as to engage the latch plate 80 and retain the pin 94 in the bore 96. Moreover, a front end portion 94e of the pin 94 has a greater diameter than the width between edges 98a,b so as to prevent the pin 94 from being pushed backward beyond the latch plate 80 by the collar 102.

An embodiment of the valve assembly 66 will now be described in detail; however, it will be appreciated that numerous valve assemblies and connector devices might be used in keeping with the principles of the present invention. The valve assembly 66, also referred to as an automatic shutoff, is slideably mounted on a circumferential inwardly projecting surface 118 of the bore 30 for longitudinal movement of the bore 30 between first and second positions. The surface 118 forms a bore portion 30a of lesser diameter than a bore portion 30b near the back end 15 of the female receptacle assembly 14. The valve assembly 66 includes a hollow needle-like structure 112 which extends longitudinally toward the front end 13 of the female receptacle assembly 14. The needle-like structure 112 is constructed and arranged at its front end for puncturing the membrane 64 as the tubular portion 18 inserted into the bore 30 of the female receptacle assembly 14. In the embodiment shown, the front end of the needle 112 facing the front end 13 is biased so as to lie in an oblique plane with respect to the plane of the membrane 64. The needle-like structure 112 has an outside diameter which is less than the inside diameter of the bore 30 that as illustrated in FIG. 5, the needle-like structure 112 extends a limited axial distance into the bore 30 when the male insert 12 and female receptacle assembly 14 are in a coupled state. Immediately adjacent the needle-like structure 112 is an outwardly extending collar 114 which is adapted for guiding the valve assembly 66 in the bore 30 and for engaging the first end 26 of the male insert 12 so as to limit the distance which the needle-like structure 112 extends into the interior of the bore 30. In addition, the collar 114 retains a coiled spring 116 between itself and a shoulder portion formed by inwardly projecting surface 118. The coiled spring 116 surrounds the body of the valve assembly 66 and biases the valve assembly toward the front end 13 of the female receptacle assembly 14. Near the opposite end of the valve assembly 66 is a groove in the outer surface thereof which extends about the circumference thereof and is adapted for retaining an o-ring 120 which serves as a seal between the valve assembly 66 and the end of the inwardly projecting surface 118 when the valve assembly 66 is in the closed position as it is when coupling 10 is in an uncoupled state. In addition, the o-ring 120 cooperates with the end of the inward projection 118 to limit longitudinal displacement of the valve assembly 66 by the spring 116. When the male insert 12 is inserted into the bore 30 of the female receptacle assembly 14, the valve assembly 66 is forced longitudinally toward the back end 15 and into the opened position. This is accomplished by the engagement of the collar 114 with the first end 26 of the male insert 12. The axial displacement toward the back end 15 is limited by the collar 102 of the male insert 12 which engages the front end 13 of the female receptacle assembly 14 and prohibits any further movement. The portion of the valve assembly 66 between the collar 114 and o-ring 120 is a hollow tubular member 122 closed at the back end and open at the front end so as to allow the flow of fluid from the needle-like structure 112 into the tubular member 122. An aperture 124 positioned near the o-ring 120 along the tubular member 122 such that when the valve assembly 66 is in the opened position as shown in FIG. 5, the aperture 124 defines a fluid passageway from the interior of the tubular member 122 to the bore 30a adjacent the back end 15 whereby continuous fluid flow is provided through the coupling 10 when in the coupled state.

Figure 9:
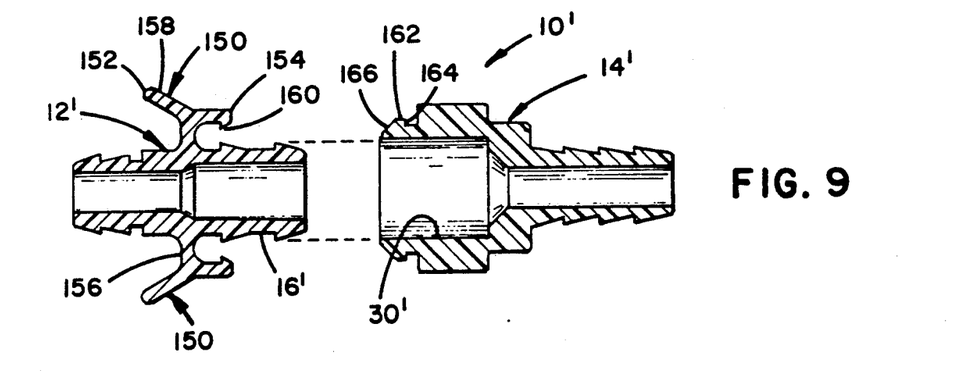
FIG. 9 is a sectional view of an alternate embodiment the male member having latch members being integrally molded therewith and of one piece therewith, the male insert being illustrated generally in alignment with a cooperating female receptacle assembly is an uncoupled state.
Figure 10:
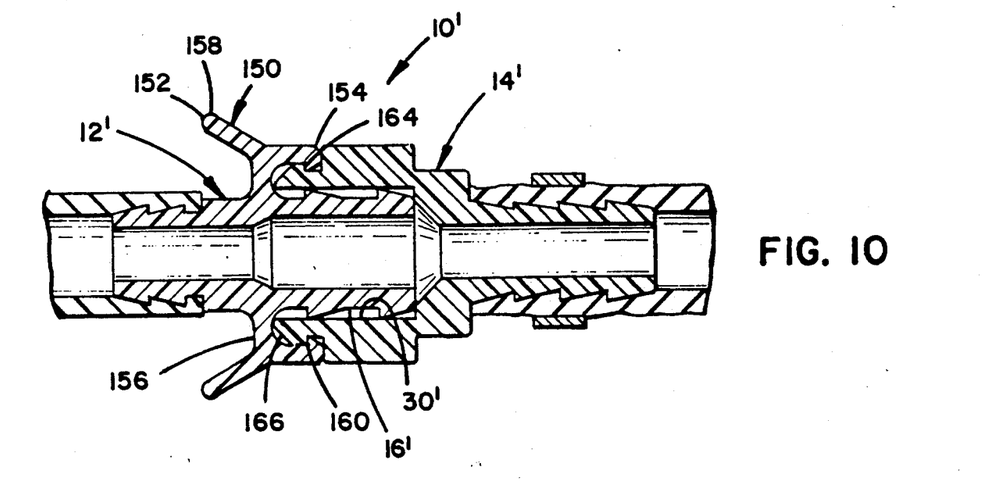
FIG. 10 is a enlarged view of the embodiment shown in FIG. 9 in a coupled state.

Illustrated in FIG. 9 and 10 is an alternate embodiment of the coupling assembly, referred to generally by 10. (Elements corresponding to those illustrated in FIGS. 1-8, being designated by primed reference numerals.) As illustrated, this embodiment of the male insert 12' includes two latching member 150 integrally molded and of one piece with the male insert member 12'. The latching members are resiliently biased into their normal state as generally illustrated in FIG. 9. The latching members 150 have a first end 152 and a second end 154, each radially removed from the body 16' of the male insert 12'. The latching members 150 are attached to the body 16' and supported by a support member portion 156 intermediate of the first and second ends 152,154. The member portion 156 functions as one piece, integral hinge in that it allows pivotal movement if the latching members 150 relative to the body 16' generally about the member portions 156. Intermediate the first ends 152 and the portions 156 are handle portions 158 of the latching members 150 which can be grasped by a user and forced toward each other such that the second ends 154 are forced apart. The second ends 154 include jaw members 160 for engaging a shoulder portion 162 on the female receptacle assembly 14'. Accordingly, the latching members 150 cooperate with the shoulder portion 162 to latch the male insert 12' in a coupled relationship to the female receptacle assembly 14'. The jaw members 160 are normally resiliently biased such that if the male insert 12' is properly axially positioned in the bore 30' of the female receptacle assembly 14', the jaw members 160 will engage the shoulder portion 162. To uncouple the coupling, the user forces the jaw members 160 apart by gripping the handle portions 158 and forcing them together. When the jaw members 160 are clear of the shoulder portion 162, the male insert can be removed from the bore 30' of the female receptacle assembly 14' while gripping the handlike portions 158. In the embodiment shown, the shoulder portion 162 includes a radially directed surface 164 which engages the jaw members 160 and cooperates therewith to retain the male insert 12' in a coupled relationship with the female receptacle assembly 14'. Further, the shoulder portion includes an inclined surface 166 which functions as a ramp for forcing the jaw members apart upon inserting the male insert 12' into the bore 30'. Upon traveling beyond the end of the surface 166, the jaw members 160 will return to their normal position and latch the male insert 12' in the coupled state. Although the female receptacle assembly 14' shown does not include the valve assembly 66, it will be appreciated that such a valve assembly might be present as well as various other valve assemblies. In one embodiment, the male insert 12' is made of molded plastic.

It is to be understood; however, that although the principles of the present invention have been described in terms of one or more embodiments, and even though numerous characteristics and advantages of the invention have been set forth in the foregoing description, together with details of the structure and function of the invention, the disclosure is illustrative only, and changes may be made in detail, especially in matters of shape, size and arrangement of parts within the principles of the invention, to the full extent indicated by the broad general meaning of the terms in which the appended claims are expressed.

What is claimed is:

1. A male insert member, comprising:
(a) a one piece body defining a path for the flow of fluid;
(b) a first resilient seal member of one piece with the body, the first seal member circumferentially surrounding an exterior of the body proximate one end of the body, the first seal member having an outwardly facing sealing surface diverging from the body in a direction away from the one end, a part line being absent from the sealing surface, a part line being present at the juncture of the sealing surface proximate a back end of the seal member and a surface interconnecting the body to the sealing surface, the first seal member providing the body with a greater wall thickness along at least a portion thereof; and
(c) a second resilient seal member of one piece with the body, the second seal member located between the first seal member and an opposite end of the body, the second seal member having an outwardly facing sealing surface;
(d) the first seal member and the second seal member each having a portion with a greater outside diameter than an outside diameter of a portion of the body between the first seal member and the second seal member.

2. A male insert member in accordance with claim 1, further including a latching member of one piece therewith, the latching member being pivotally attached to the body by a support portion, the latching member including a handle portion radially spaced apart from the body and a jaw member radially spaced apart from the body, the latching member being resiliently biased into a normal state, whereby forcing radially inward on the handle portion causes the jaw member to move radially away from the body into a disturbed state and releasing the handle portion causes the jaw member to move radially toward the body into its normal state.

3. A coupling assembly, comprising:
(a) a male insert member defining a path for the flow of fluid, the male insert includes a resilient seal member integrally molded with the male insert member so as to be of one piece with the male insert member, the seal member circumferentially surrounding an exterior of the male insert member proximate a first end, the seal member having an outwardly facing sealing surface diverging from the male insert member in a direction away from the first end, a part line being absent from the sealing surface, a part line being present at the juncture of the sealing surface proximate a back end of the seal member and a surface interconnecting the male insert member to the sealing surface, the seal member providing the male insert with a greater wall thickness along at least a portion thereof, the male insert member having an enlarged diameter portion with an outside diameter greater than an outside diameter of the male insert member between the enlarged diameter portion and the seal member;
(b) a female receptacle assembly including a body portion defining a pathway for the flow of fluid therethrough, the first end of the male insert member being receivable in a bore of the female receptacle assembly in a coupled state, the seal member having a greater outside diameter than an inside diameter of the female receptacle and being more deformable than the body portion defining the bore, the sealing surface engaging the bore of the female to form a fluid tight seal in the coupled state; and
(c) latching means for positively latching the male insert and the female receptacle assembly in the coupled state.

4. A coupling assembly in accordance with claim 3, wherein the male insert is made of a molded plastic material.

5. A coupling assembly in accordance with claim 3, wherein the latching means is mounted on the female receptacle assembly so as to be integral with the female receptacle assembly, the latching means including a movable latch plate member, the male insert including a latching structure engageable with the latch plate member, the latch plate and the latch plate structure cooperating to latch the male insert and the female receptacle assembly in the coupled state.

6. A coupling assembly in accordance with claim 5, wherein the latching structure includes a cavity in an exterior surface of the male insert.

7. A coupling assembly in accordance with claim 6, wherein the cavity of the latching structure extends circumferentially about the male insert member.

8. A coupling assembly in accordance with claim 3, wherein the seal member is made from a softer material than the body portion of the female receptacle assembly defining the bore, whereby the seal member is more readily deformable than the body portion defining the bore so as to be deformed upon insertion into the bore.

9. A coupling assembly in accordance with claim 3, wherein the seal member has first and second oppositely facing ends, the second end facing away from the first end of the male insert and defining a shoulder portion extending away from the male insert member, the shoulder portion defining a cavity whereby the seal member proximate the second end is more readily deformable than the body portion defining the bore so as to be deformed upon insertion into the bore.

10. A coupling assembly in accordance with claim 3, wherein a plurality of the seal members are present on the male insert.

11. A coupling assembly, comprising:
(a) a one piece molded plastic male insert defining a path for the flow of fluid having first and second ends, the male insert including a tubular portion, proximate the first end, a groove extending circumferentially around an exterior surface of the tubular portion, the groove providing the male insert with an outside diameter less than an outside diameter of a portion of male insert adjacent the groove in a direction toward the first end and in a direction toward the second end, a resilient seal member, integrally molded with the male insert and of one piece with the male insert, extending circumferentially about the exterior surface of the tubular portion, the seal member having a slanted exterior sealing surface diverging away from the tubular portion in a direction from the first end of the male insert, the sealing surface being part line free, a part line being present at the juncture of the sealing surface proximate a back end of the seal member and a surface interconnecting the tubular portion to the sealing surface, the seal member providing the male insert with a greater wall thickness along at least a portion thereof; and
(b) a female receptacle assembly having a body portion defining a bore for the flow of fluid therethrough, the tubular portion of the male insert being receivable in the bore in a coupled state, the female receptacle including mechanical latch means mounted therewith for latching the female receptacle assembly and the male insert in the coupled state, the latch means including a plate member for engaging the groove of the male insert when in the coupled state, at least a portion of the seal member having a greater outside diameter than the inside diameter of the bore, the seal member being resilient and more readily deformable than an interior surface of the body portion defining the bore, the sealing surface engaging the bore of the female receptacle assembly to form a fluid tight seal therewith, the latch means including release means for disengaging the plate member from the groove of the male insert whereby the male insert can be removed from the bore of the female receptacle assembly so as to place the coupling assembly in an uncoupled state.

12. A male insert member, comprising:
(a) a one piece molded plastic body defining a path for the flow of fluid having a first end and a second end;
(b) a resilient seal member of one piece with the body, the seal member circumferentially surrounding an exterior of the body proximate the first end of the body, the seal member having an exterior sealing surface diverging from the body in a direction away from the first end, a part line being absent from the sealing surface, a part line being present at the juncture of the sealing surface proximate a back end of the seal member and a surface interconnecting the body to the sealing surface.

13. A male insert member, comprising:
(a) a one piece molded body defining a path for the flow of fluid;
(b) a resilient seal member integrally molded with the body so as to be of one piece with the body, the seal member circumferentially surrounding an exterior of the body, the seal member having an outwardly facing sealing surface, the sealing surface being part line free, a part line being present at the juncture of the sealing surface proximate a back end of the seal member and a surface interconnecting the body to the sealing surface, the seal member providing the body with a greater wall thickness along at least a portion thereof; and
(c) the body having an enlarged diameter portion with an outside diameter greater than an outside diameter of the body between the enlarged diameter portion and the seal member.

* * * * *